US011464008B2

United States Patent
Zhou et al.

(10) Patent No.: US 11,464,008 B2
(45) Date of Patent: Oct. 4, 2022

(54) DETERMINATION RULE OF PDSCH SCHEDULED SLOT WITH PDCCH REPETITION

(71) Applicant: QUALCOMM Incorporated, San Diego, CA (US)

(72) Inventors: Yan Zhou, San Diego, CA (US); Tao Luo, San Diego, CA (US); Makesh Pravin John Wilson, San Diego, CA (US); Muhammad Nazmul Islam, Littleton, MA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/427,058

(22) Filed: May 30, 2019

(65) Prior Publication Data
US 2020/0022139 A1    Jan. 16, 2020

Related U.S. Application Data

(60) Provisional application No. 62/697,299, filed on Jul. 12, 2018.

(51) Int. Cl.
*H04W 72/04* (2009.01)
*H04L 5/00* (2006.01)
*H04W 72/14* (2009.01)

(52) U.S. Cl.
CPC ....... *H04W 72/0446* (2013.01); *H04L 5/0051* (2013.01); *H04W 72/14* (2013.01)

(58) Field of Classification Search
CPC .............. H04W 72/0446; H04W 72/14; H04L 5/0051; H04L 5/0053; H04L 5/005; H04L 5/0094; H04L 5/0044; H04L 5/0007
See application file for complete search history.

(56) References Cited

U.S. PATENT DOCUMENTS

2016/0242150 A1 * 8/2016 Kang .................... H04L 5/0094
2018/0220400 A1 * 8/2018 Nogami ................ H04W 76/27
(Continued)

FOREIGN PATENT DOCUMENTS

WO    WO-2015046830 A1 * 4/2015 ............... H04B 7/26

OTHER PUBLICATIONS

Huawei et al., "PDCCH Reliability for URLLC", 3GPP Draft; R1-1709986, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017, Jun. 26, 2017, XP051299211, Retrieved from the Internet: URL: http://www.3gpp.org/ftp/Meetings_3GPP_SYNC/RAN1/Docs/ [retrieved on Jun. 26, 2017], 7 pages.

(Continued)

*Primary Examiner* — Steven H Nguyen
(74) *Attorney, Agent, or Firm* — Qualcomm Incorporated

(57) ABSTRACT

Repetitive PDCCH may be utilized to extend control channel coverage. The PDCCH may be configured to repeat in adjacent or non-adjacent slots per monitoring occasion of corresponding search space. The PDCCH may carry control information such as a grant that schedules a channel for a wireless device, such that the wireless device receives instructions for scheduling a channel at a scheduled slot. The apparatus may receive control information in a repetitive PDCCH within a set of slots. The repetitive PDCCH schedules a channel for reception or transmission by the UE. The apparatus may determine a scheduled slot index for the channel scheduled by the repetitive PDCCH. The apparatus may communicate the channel at the determined scheduled slot index and based on the received control information in the repetitive PDCCH. The channel may be a PDSCH, a PUSCH, or may carry A-CSI-RS.

26 Claims, 11 Drawing Sheets

(56) References Cited

U.S. PATENT DOCUMENTS

| | | | |
|---|---|---|---|
| 2018/0279297 A1* | 9/2018 | Nogami | H04W 72/042 |
| 2018/0279327 A1* | 9/2018 | Ying | H04L 5/0044 |
| 2018/0324770 A1* | 11/2018 | Nogami | H04L 5/005 |
| 2019/0182807 A1* | 6/2019 | Panteleev | H04L 1/0068 |
| 2020/0022144 A1* | 1/2020 | Papasakellariou | H04W 72/0453 |
| 2020/0154467 A1* | 5/2020 | Gong | H04W 24/08 |
| 2020/0177254 A1* | 6/2020 | Lee | H04W 56/0045 |
| 2020/0213069 A1* | 7/2020 | Jiang | H04L 5/0053 |
| 2020/0221429 A1* | 7/2020 | Li | H04L 5/0053 |

OTHER PUBLICATIONS

Huawei et al., "PDCCH Reliability for URLLC", 3GPP Draft; R1-1716778, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017 Sep. 20, 2017, XP051353877, Retrieved from the Internet: URL:http://www.3gpp.org/ftp/tsg ran/WG1_RL1/TSGR1 AH/NR_AH_1709/Docs/ [retrieved on-Sep. 20, 2017], 9 pages.

Huawei et al., "Timing Relationship between PDCCH and POSCH for Coverage Improvement", 3GPP Draft; R1-135022, 3rd Generation Partnership Project (3GPP), Mobile Competence Centre, 650, Route Des Lucioles, F-86921 Sophia-Antipolis Cedex, France, vol. RAN WG1, No. San Francisco, USA, Nov. 11, 2013-Nov. 15, 2013, Nov. 13, 2013 (Nov. 13, 2013), XP050734725, 4 Pages, Retrieved from the Internet: URL:http://www.3gpp.org/ftp/Meetings_3GPP_SYNC/RAN/RAN1/Docs/ [retrieved on Nov. 13, 2013].

International Search Report and Written Opinion—PCT/US2019/034961—ISA/EPO⇒dated Aug. 22, 2019.

* cited by examiner

DETERMINATION RULE OF PDSCH SCHEDULED SLOT WITH PDCCH REPETITION

CROSS REFERENCE TO RELATED APPLICATION(S)

This application claims the benefit of U.S. Provisional Application Ser. No. 62/697,299, entitled "Determination Rule of PDSCH Scheduled Slot with PDCCH Repetition" and filed on Jul. 12, 2018, which is expressly incorporated by reference herein in its entirety.

BACKGROUND

Technical Field

The present disclosure relates generally to communication systems, and more particularly, to methods and apparatus to determine PDSCH scheduled slot with PDCCH repetition for devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. In one configuration, a UE receives control information in a repetitive physical downlink control channel (PDCCH) within a set of slots. The repetitive PDCCH schedules a channel for reception or transmission by the UE. The UE determines a scheduled slot index for the channel scheduled by the repetitive PDCCH. Subsequently, the UE communicates the channel at the determined scheduled slot index and based on the received control information in the repetitive PDCCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
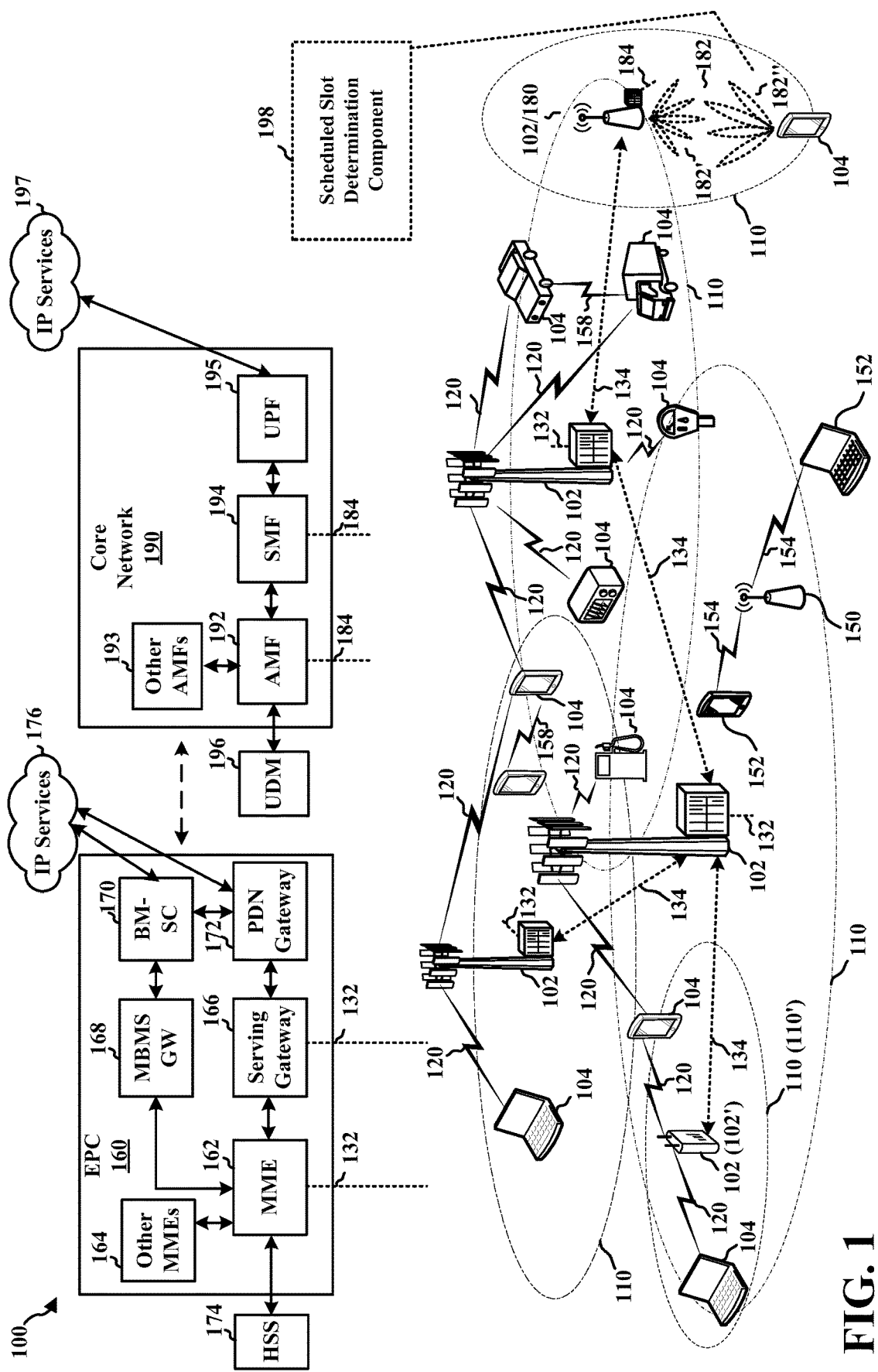
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a device (e.g., the UE 104) may comprise a scheduled slot determination component 198 configured to determine a scheduled slot index for a channel scheduled by a repetitive physical downlink control channel (PDCCH) from a base station. For example, in one configuration, the UE 104 may receive control information in a repetitive PDCCH within a set of slots. The repetitive PDCCH schedules a channel for reception or transmission by the UE. The UE 104 may determine a scheduled slot index for the channel scheduled by the repetitive PDCCH. The UE 104 may communicate (e.g., transmit or receive) the channel at the determined scheduled slot index and based on the received control information in the repetitive PDCCH. Various additional aspects and details of the disclosed methods are discussed with respect to FIGS. 5-11.

Although the following description may be focused on 5G NR, the concepts described herein may be applicable to other similar areas, such as LTE, LTE-A, CDMA, GSM, and other wireless technologies.

Figure 2B:
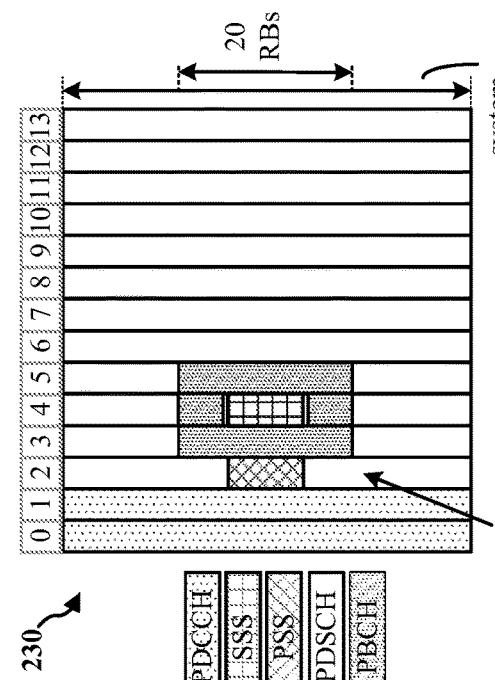
FIGS. 2A, 2B, 2C, and 2D are diagrams illustrating examples of a DL subframe, DL channels within the DL subframe, an UL subframe, and UL channels within the UL subframe, respectively, for a 5G/NR frame structure.
Figure 2D:
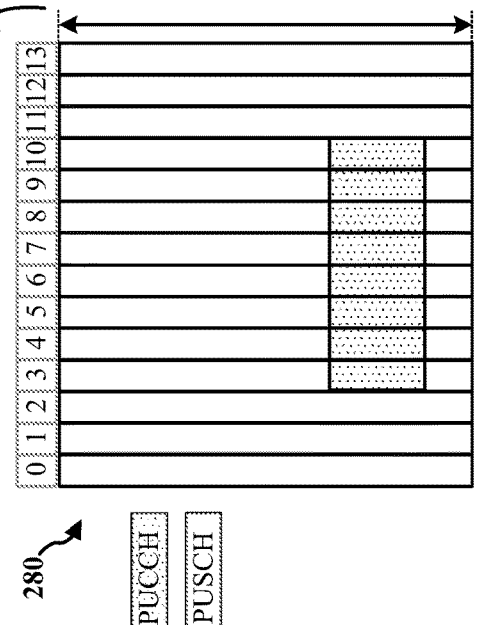
Figure 2A:
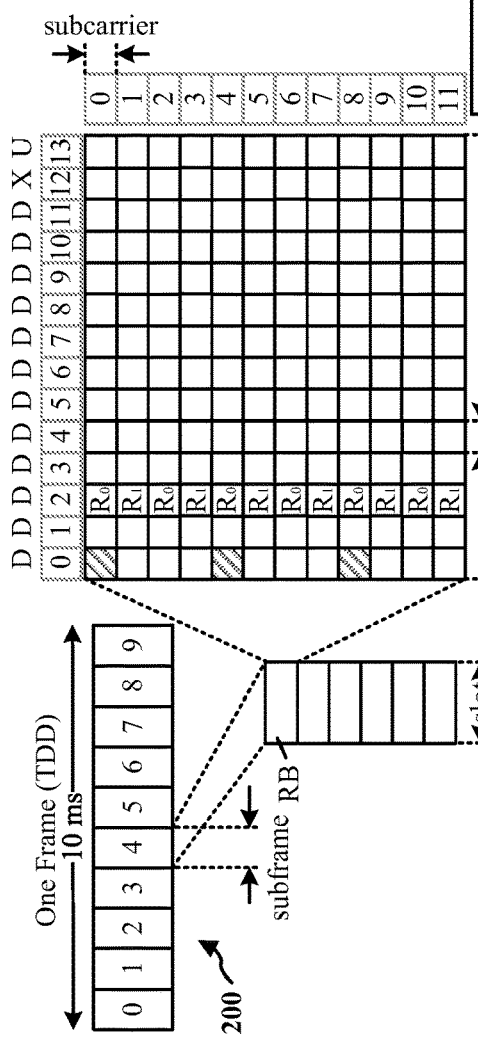
Figure 2C:
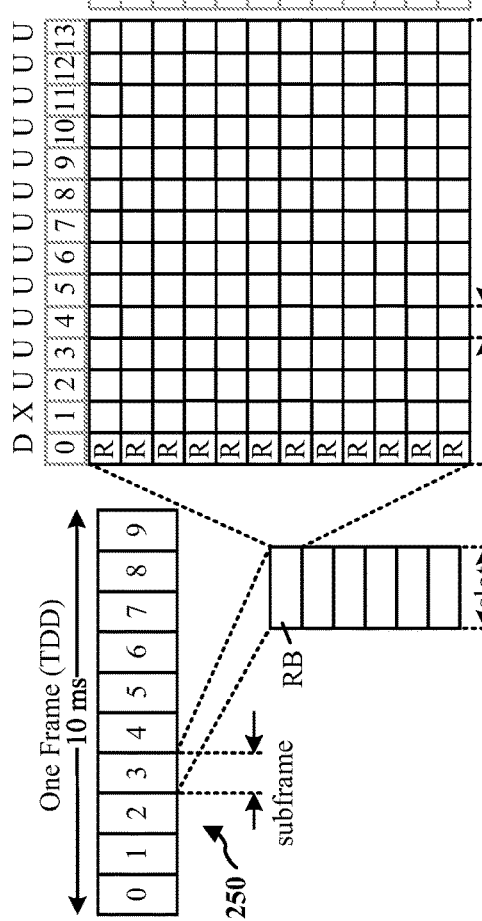

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
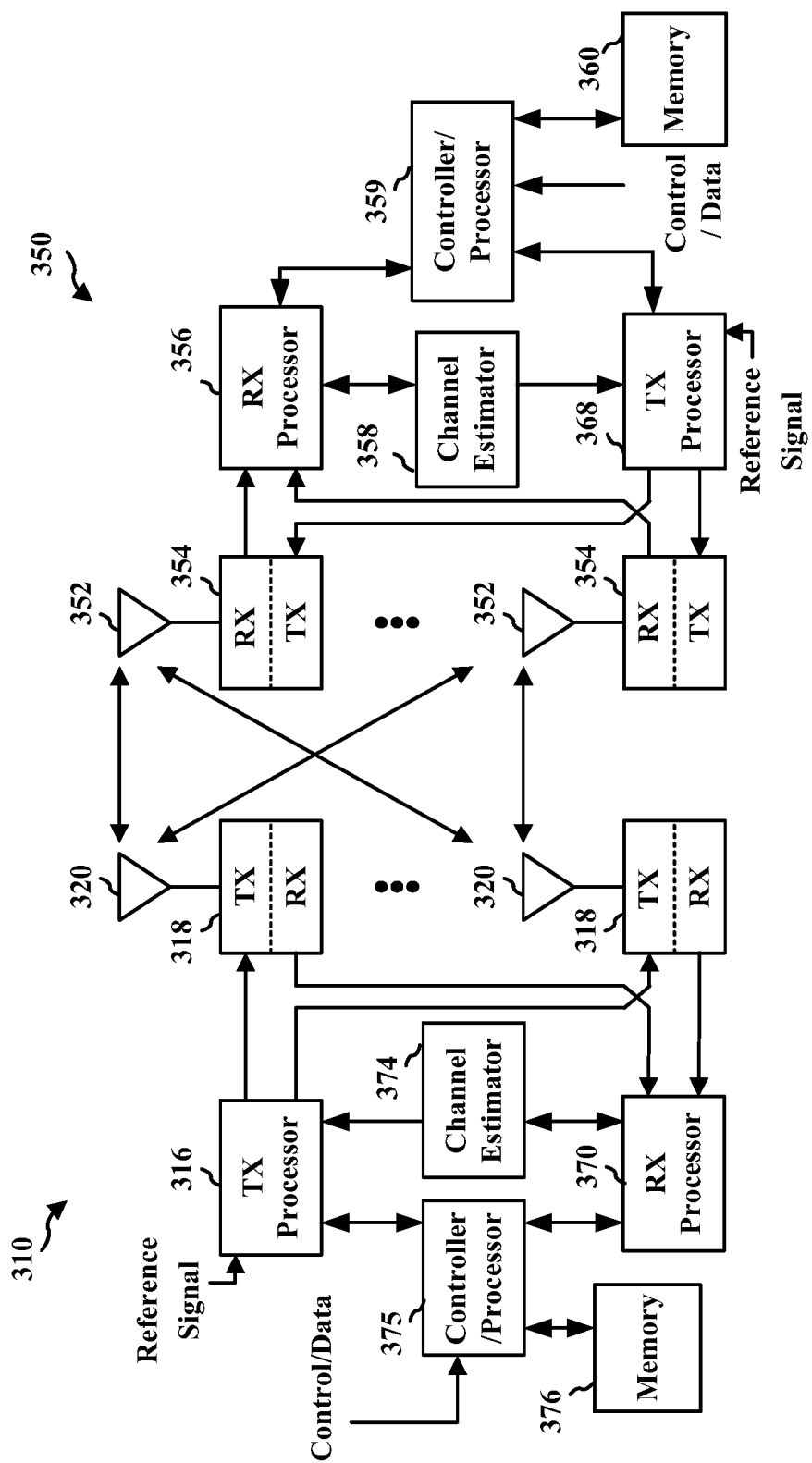
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 4:
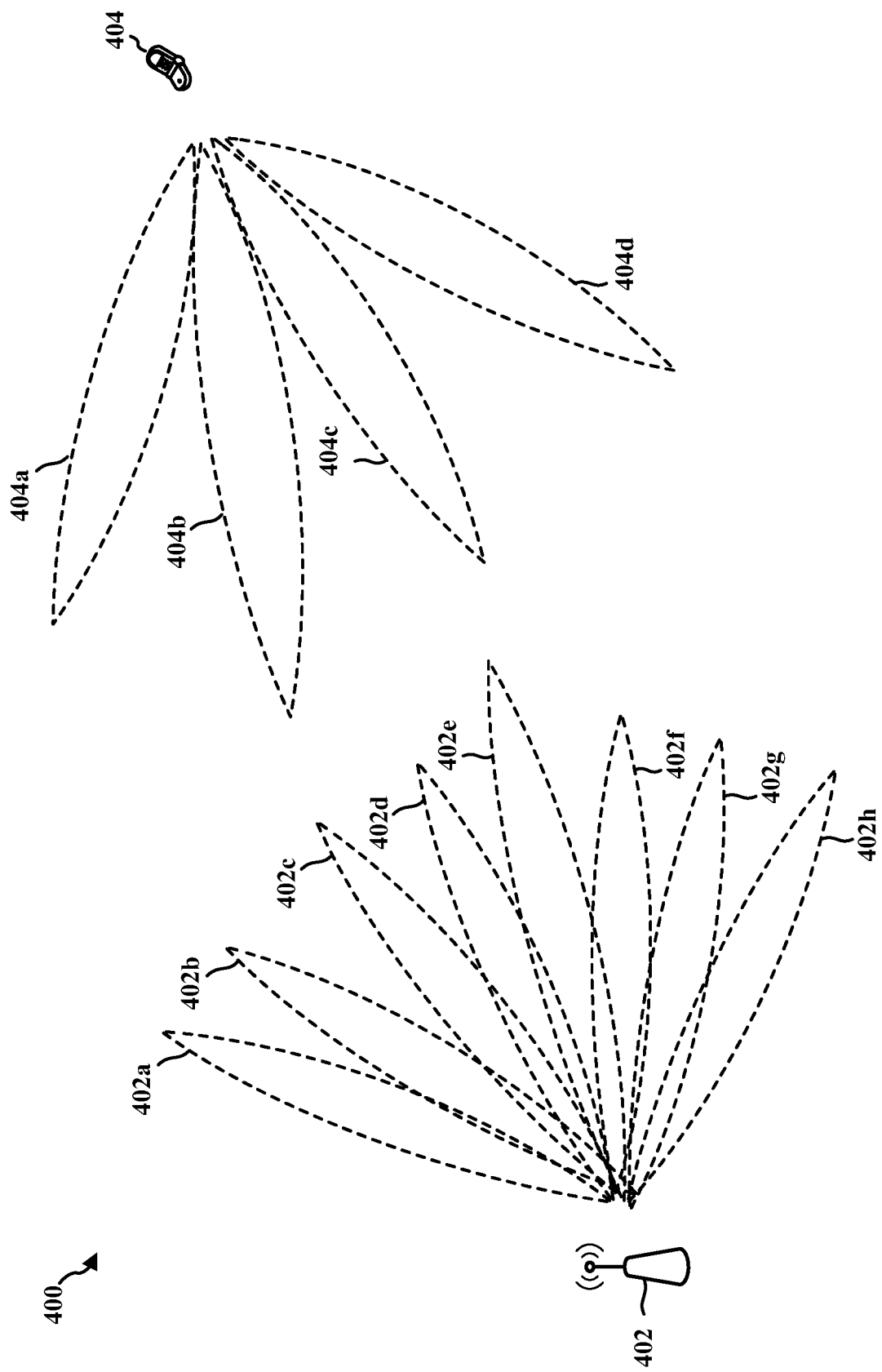
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Extending control channel coverage may be desirable in some communication systems, e.g., 5G NR networks. In 5G NR, one potential scheme to extend control channel coverage is utilizing repetitive PDCCH. The PDCCH may carry control information about data being transmitted and information for the UE with regards to the resources the UE needs to use for a scheduled UL transmission or a scheduled DL reception. The UE decodes the received PDCCH, such that the UE may determine a scheduled slot index for the channel scheduled by the PDCCH. In some aspects, the PDCCH may schedule a channel to instruct the UE to prepare for a DL reception. For example, a grant in a PDCCH may schedule a physical downlink shared channel (PDSCH) for the UE, such that the UE receives instructions for a scheduled DL reception via the PDSCH at the scheduled slot. The scheduled slot may be determined by the scheduling PDCCH slot index as a reference plus a signaled slot offset. However, in such instance, the PDCCH is non-repetitive PDCCH. Determination of the PDSCH scheduled slot may not be defined in the presence of repetitive PDCCH, especially when the PDCCH is repeated across multiple slots.

Repetitive PDCCH assists in making the PDCCH decodable by the UE especially in environments where the signal quality and/or received signal power is poor. For example, some UEs, such as but not limited to smartphones and IoT devices (e.g., parking meter, gas pump, toaster, vehicles, heart monitor, etc.), may be in areas where signal quality and/or power may be poor, such as but not limited to a basement, parking structure, and/or dense urban environments where the signal may be attenuated due to lack of signal penetration.

In aspects where a PDSCH is scheduled by non-repetitive PDCCH, the scheduled slot may be determined by the scheduling PDCCH slot index as reference plus a signaled slot index. Specifically, the slot allocated for PDSCH may be given by the following formula (which is in the kernel stack):

$$\text{floor}[n*2^{(\text{mu\_PDSCH})}/2^{(\text{mu\_PDCCH})}]+K0,$$

where "n" is the slot with the scheduling PDCCH, "mu_PDSCH" and "mu_PDCCH" are subcarrier spacing (SCS) configuration for PDSCH and PDCCH, (e.g., mu=0, 1, 2, 3, 4, 5 for SCS=15, 30, 60, 120, 240 kHz), and "K0" is a slot offset, which may be signaled in the PDCCH, otherwise a default value may be used. For example, the PDSCH and PDCCH may have different SCS, with mu_PDSCH having a 240 kHz SCS and mu_PDCCH having a 15 kHz SCS, resulting in mu_PDSCH having a value of 5 and mu_PDCCH having a value of 0. Plugging such values into the above equation results in floor [32*n]+K0. One subframe is made up of 8 slots, so in the case of 32*n, the scheduled slot is 4 subframes later, for n=1. For n=2, the scheduled slot is 8 subframes later.

Figure 5:
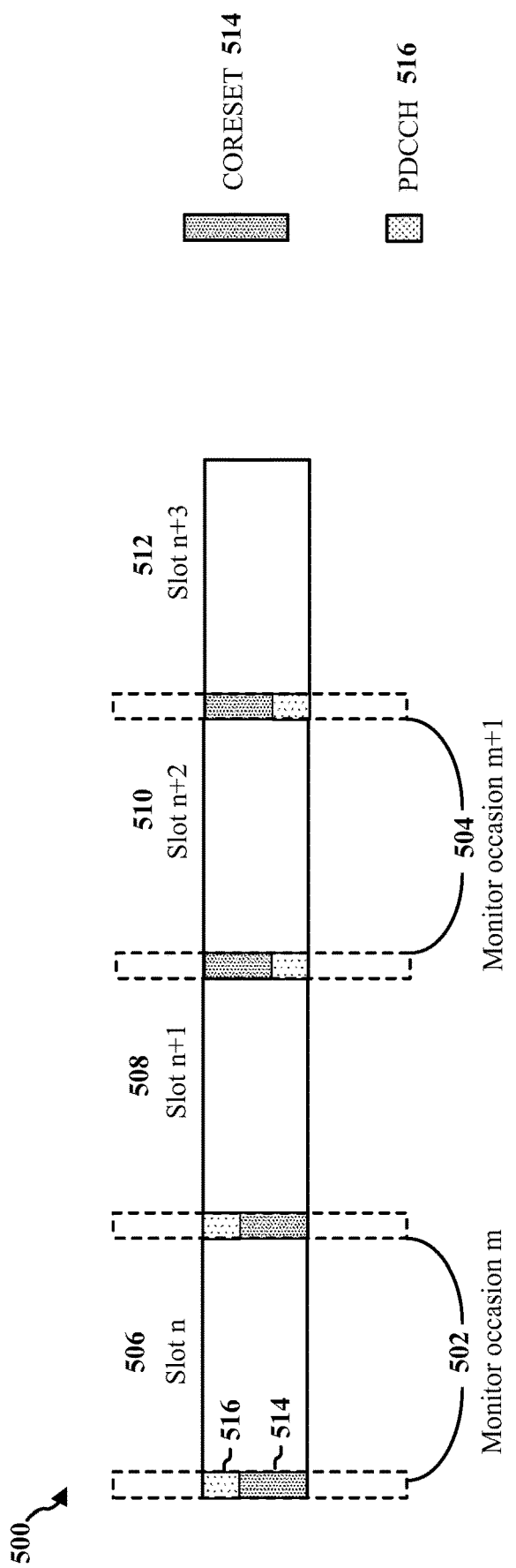
FIG. 5 illustrates an example of PDCCH repetition in adjacent slots per monitoring occasion.

FIG. 5 illustrates an example of a diagram 500 of PDCCH repetition in adjacent slots per monitoring occasion. The PDCCH may be configured to repeat in adjacent or non-adjacent slots per monitoring occasion of corresponding search space. A monitor occasion (e.g., 502, 504) may be present in multiple slots. For example, monitor occasion m 502 is at the beginning of Slot n 506 and at the beginning of Slot n+1 508. A control resource set 514 (CORESET) is present at the beginning of each slot, and the CORESET 514 carries the PDCCH 516, such that the time duration of the two CORESETs will form one monitor occasion. The time duration of the CORESET 514 at Slot n 506 and the CORESET at Slot n+1 508 may be combined to form monitor occasion m 502. Monitor occasion m+1 504 is formed by the CORESET at the beginning of Slot n+2 510 and the CORESET at the beginning of Slot n+3 512. The CORESET may be measured in time and may be formed of 1, 2, or 3 symbols. The monitoring occasion m 502 may thus be formed of 1, 2, or 3 symbols of Slot n 506 and of 1, 2, or 3 symbols of Slot n+1 508, while the monitoring occasion m+1 504 may be formed of 1, 2, or 3 symbols of Slot n+2 510 and 1, 2, or 3 symbols of Slot n+3 512.

The monitor occasion may be periodic, and in the example of FIG. 5 occurs in adjacent slots. The PDCCH may be repeated with the same content and in the same PDCCH candidate with same aggregation level and same frequency location in the CORESETs, such that the UE may perform combined decoding of the two PDCCHs. In monitor occasion m+1 504, the PDCCH may be transmitted at a different frequency location in comparison to the PDCCH transmitted in the monitor occasion m. As such, the PDCCH is repeated across adjacent slots per monitoring occasion of corresponding search space.

Figure 6:
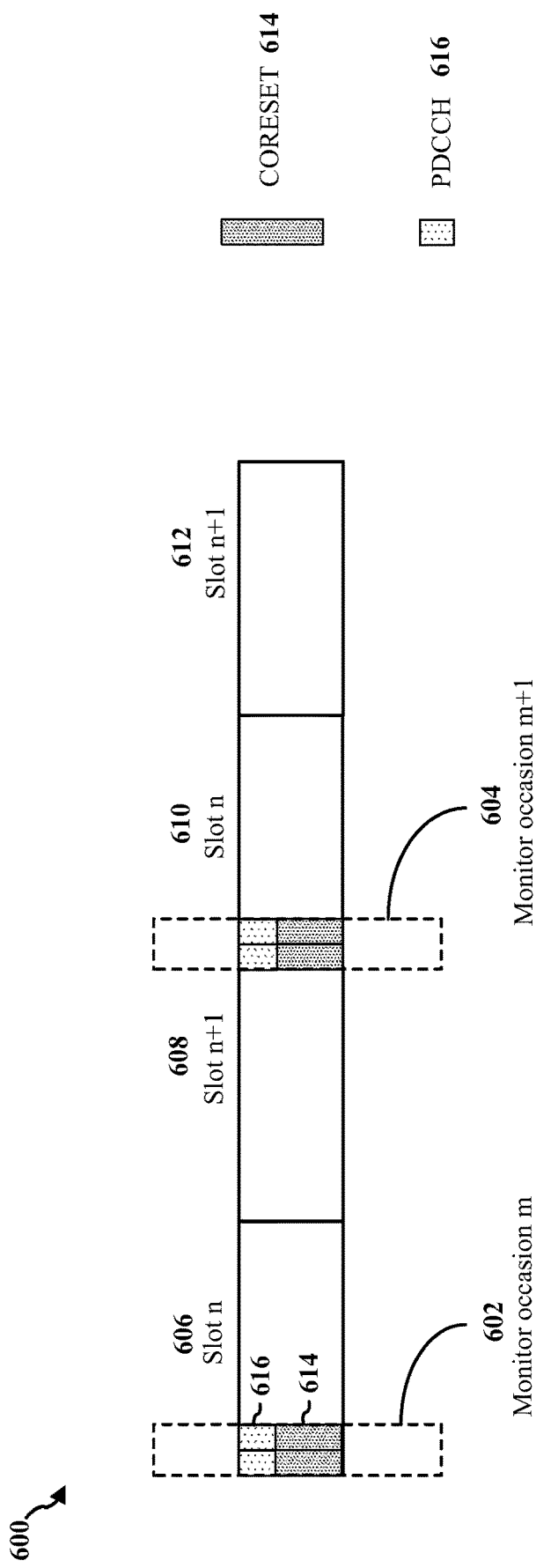
FIG. 6 illustrates an example of PDCCH repetition in adjacent symbols per monitoring occasion.

FIG. 6 illustrates an example of a diagram 600 of PDCCH repetition in adjacent symbols per monitoring occasion. The PDCCH may be configured to repeat in adjacent symbols per monitoring occasion of a corresponding search space. Each monitor occasion (e.g., 602, 604) may have two CORESETs 614, and each CORESET may have 1, 2, or 3 symbols, which in turns results in the monitor occasion having 2, 4, or 6 symbols, because the monitor occasion occurs across two adjacent symbols. The PDCCH 616 repeats and is carried by the CORESET 614, such that the PDCCH 616 repeats in adjacent symbols per monitoring occasion (e.g., 602, 604). In general, the PDCCH 616 may be repeated in adjacent or non-adjacent symbols per monitoring occasion. Those symbols may be in same slot or across adjacent or non-adjacent slots.

In yet other examples, the PDCCH may be repeated across multiple monitor occasions. However, determination of the PDSCH scheduled slot is not defined in the presence of repetitive PDCCH, especially when the PDCCH is repeated across multiple slots.

Figure 7:
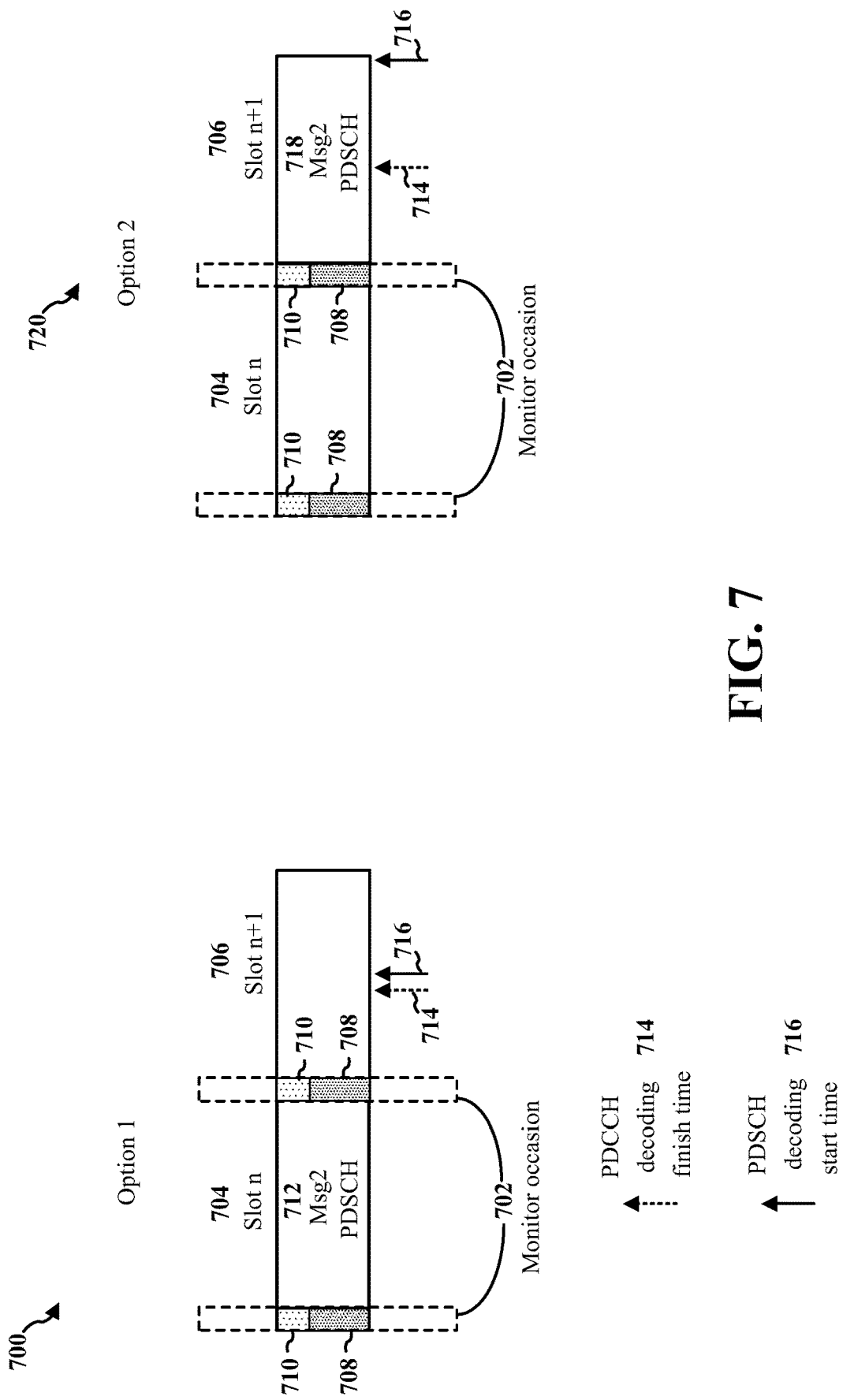
FIG. 7 illustrates examples of scheduled PDSCH slots with PDCCH repetition.

FIG. 7 illustrates examples of diagrams 700, 720 to determine the scheduled PDSCH slots with PDCCH repetition. In one aspect, the reference slot index may be the index of the slot containing a particular repeated PDCCH. In some examples, the particular repeated PDCCH 710 may be the $1^{st}$, last, or any received PDCCH transmission. In some aspects, the particular PDCCH may be across multiple slots (e.g., 704, 706), such that the reference slot index may be the index of the slot containing the start or the end of the particular PDCCH. The repetitive PDCCH may include n received PDCCHs and the scheduled slot index may be determined based on a slot index of an $i^{th}$ received PDCCH of the n received PDCCHs. The particular repeated PDCCH may be determined in a specification (e.g., hard coded within the UE) or signaled to the UE dynamically. For example, if the PDCCH is repeated across multiple slots, then the scheduled PDSCH slot may be determined based on two different options: 1) the $1^{st}$ PDCCH slot or 2) the last PDCCH slot.

In the first option 700, the scheduled PDSCH (e.g., 712) may be scheduled as early as in the $1^{st}$ PDCCH slot (e.g. 704), which may have the advantage of reducing latency because PDSCH decoding may start (e.g., 716) soon after the decoding of the PDCCH has finished (e.g., 714). The monitor occasion (e.g., 702) may be at the beginning of Slot n 704 and at the beginning of Slot n+1 706. The CORESET 708 may be present at the beginning of each slot, and the CORESET 708 carries the PDCCH 710. The PDCCH 710 may be repeated across multiple slots, such as, for example, Slot n 704 and Slot n+1 706. The first slot, Slot n 704, may be used to calculate the slot index. In the first option, the PDSCH 712 may be scheduled in the first slot, Slot n 704, such that the PDSCH may be received during Slot n 704 and before reception of the second PDCCH 710 within Slot n+1 706. As such, the combined decoding of the two CORESETs 708 having the PDCCH 710 may be completed in Slot n+1 706, and the PDSCH may start decoding (e.g., 716) within Slot n+1 706 after the PDCCH 710 has been decoded (e.g., 714). However, a drawback of the first option 700 is that the received data between the monitored CORESETs (e.g., $1^{st}$ PDCCH, PDSCH, $2^{nd}$ PDCCH, the combination of the $1^{st}$ and $2^{nd}$ PDCCH) might need to be buffered. The data may need to be buffered due to the decoding of the PDCCH 710 occurring in Slot n+1 706.

In the second option 720, may be configured similarly as the first option 700, but the PDSCH (e.g., 718) may be scheduled in the last PDCCH slot (e.g., 706). The PDCCH may be configured to repeat across Slot n 704 and Slot n+1 706, and the monitor occasion (e.g., 702) may be at the beginning of Slot n 704 and at the beginning of Slot n+1 706. The CORESET 708 may be present at the beginning of each slot, and the CORESET 708 carries the PDCCH 710. In the second option 720, the decoding of the combined PDCCHs will be completed (e.g., 714) within Slot n+1 706, such that the PDSCH may be scheduled in the slot Slot n+1 706. In some aspects, the decoding of the combined PDCCHs may be completed (e.g., 714), but the reception of the PDSCH may not yet be completed. As such, decoding of the PDSCH may commence (e.g., 716) when the PDSCH has been fully received, which in the second option 720 may occur at the end of Slot n+1 706. As a result, the second option 720 may introduce latency, in comparison to first option 700. However, the second option 720 may provide some advantages that are not present in the first option 700. For example, the second option 720 may not need to buffer the data between the monitored CORESETs because the PDSCH may be scheduled for the last slot. The scheduler of the second option may be configured to schedule the PDSCH after the completion of the decoding of the PDCCH 710.

In another aspect, the reference slot index may be independent of the scheduling PDCCH. For example, the reference slot index may be the $1^{st}$ slot in the frame containing the repeated PDCCH. In another example, the schedule slot index is configured to be an $m^{th}$ slot in a frame including the repetitive PDCCH, the $m^{th}$ slot being fixed. In another example, the reference slot index may be determined in a specification (e.g., hard coded within the UE) or may be signaled to the UE dynamically. In this aspect, the reference time slot index may be totally independent of PDCCH transmission, such that the slot index may be any copy of the PDCCH. The reference time slot index may simply be the first slot in the frame containing the repeated PDCCH.

At least one advantage of determining the scheduled PDSCH slots with PDCCH repetition is that the manner of determining the scheduled PDSCH may also be used to determine other scheduled signals channels, such as but not limited to PUSCH and aperiodic channel state information reference signals (A-CSI-RS), both of which may be scheduled by the PDCCH. If PDCCH with repetition is applied, then the reference slot to calculate the scheduling of PUSCH or A-CSI-RS may be determined in the same manners as discussed herein. Yet another advantage is that if the scheduled channel has multiple transmissions across slots (e.g., PDSCH/PUSCH slot aggregation), then the determined scheduled slot index may be applied to a particular transmission, such as but not limited to the $1^{st}$ transmission of the scheduled channel. The particular transmission may be determined in a specification (e.g., hard coded to the UE) or signaled to the UE dynamically.

Figure 8:
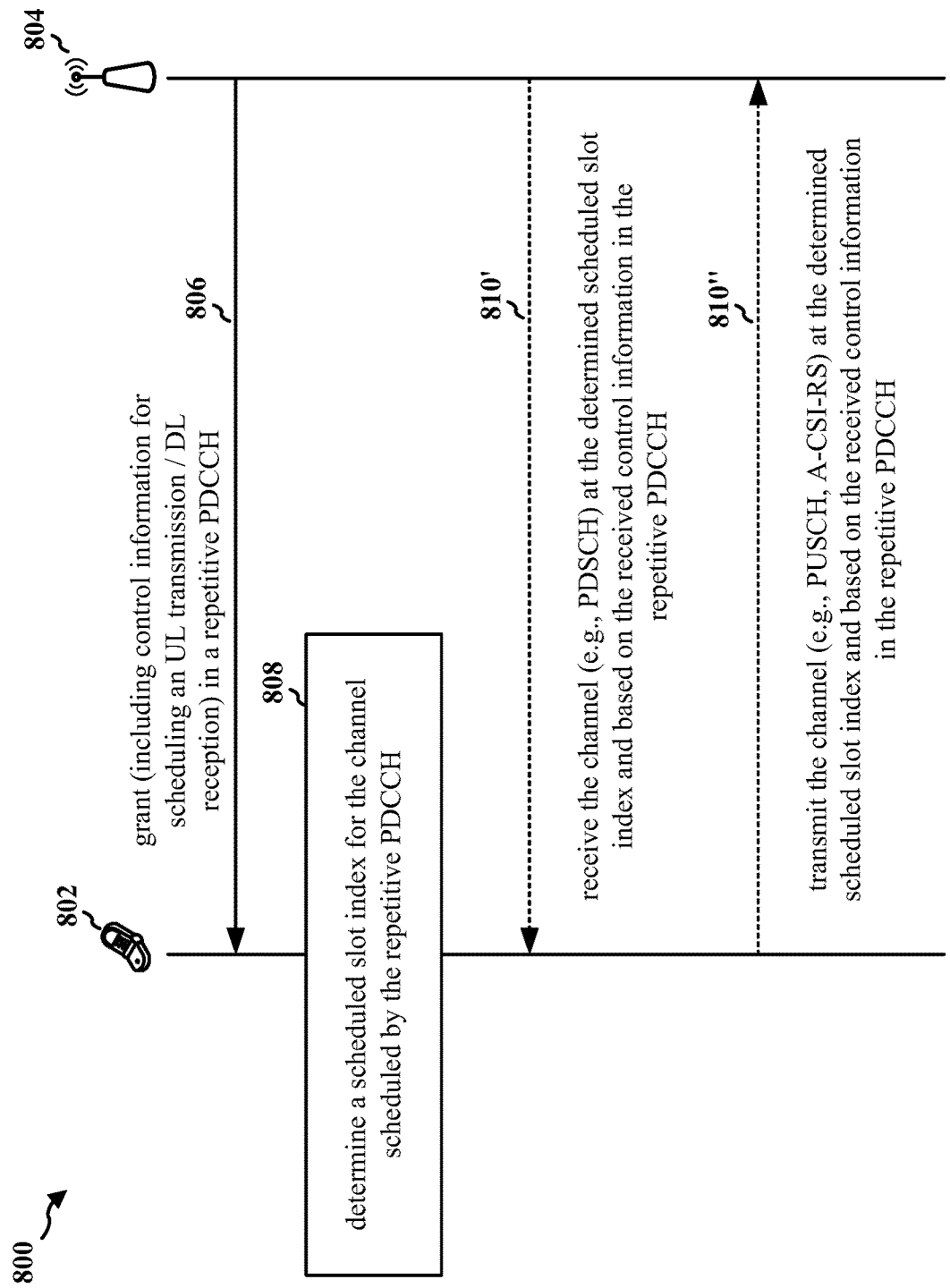
FIG. 8 illustrates an example communication flow between a base station and a UE.

FIG. 8 illustrates an example of communication 800 between a base station 804 and a UE 802. The UE may correspond to UE 104, 350, 404, 802, apparatus 1002/1002'. The base station 804 may correspond to base station 102, 180, 310, 402, 804, 1050. The communication between base station 804 and UE 802 may comprise mmW communication.

At 806, the UE 802 receives a grant (including control information for scheduling an UL transmission/DL reception) in a repetitive PDCCH from the base station 804. In some aspects, the grant may be configured to schedule a channel for DL reception in accordance with diagrams 700 and/or 720 of FIG. 7. In some aspects the channel for DL reception may be a PDSCH. The repetitive PDCCH may schedule the PDSCH for reception by the UE. In some aspects, the grant may be configured to schedule a channel for UL transmission (e.g., PUSCH or A-CSI-RS). The repetitive PDCCH may schedule the PUSCH for transmission by the UE. The repetitive PDCCH may schedule the channel for transmission of the A-CSI-RS by the UE.

At 808, the UE may be configured to determine a scheduled slot index for the channel scheduled by the repetitive PDCCH. The UE may be configured to utilize the methods discussed above with respect to FIG. 7 as to determine the scheduled slot index. In some aspects, the scheduled slot index may be determined by a slot index of at least one PDCCH of the repetitive PDCCH. The repetitive PDCCH may include n received PDCCHs and the scheduled slot index may be determined based on a slot index of an $i^{th}$ received PDCCH of the n received PDCCHs. In some aspects, the slot index may be determined based on a $1^{st}$ received PDCCH of the n PDCCHs of the repetitive PDCCH. In some aspects, the slot index may be determined based on an $n^{th}$ received PDCCH of the n PDCCHs of the repetitive PDCCH.

At 810', the UE may be configured to receive the channel (e.g., PDSCH) at the determined scheduled slot index and based on the received control information in the repetitive PDCCH from the base station 804.

Alternatively, at 810'', the UE may be configured to transmit the channel (e.g., PUSCH, A-CSI-RS) at the determined scheduled slot index and based on the received control information in the repetitive PDCCH to the base station 804.

Figure 9:
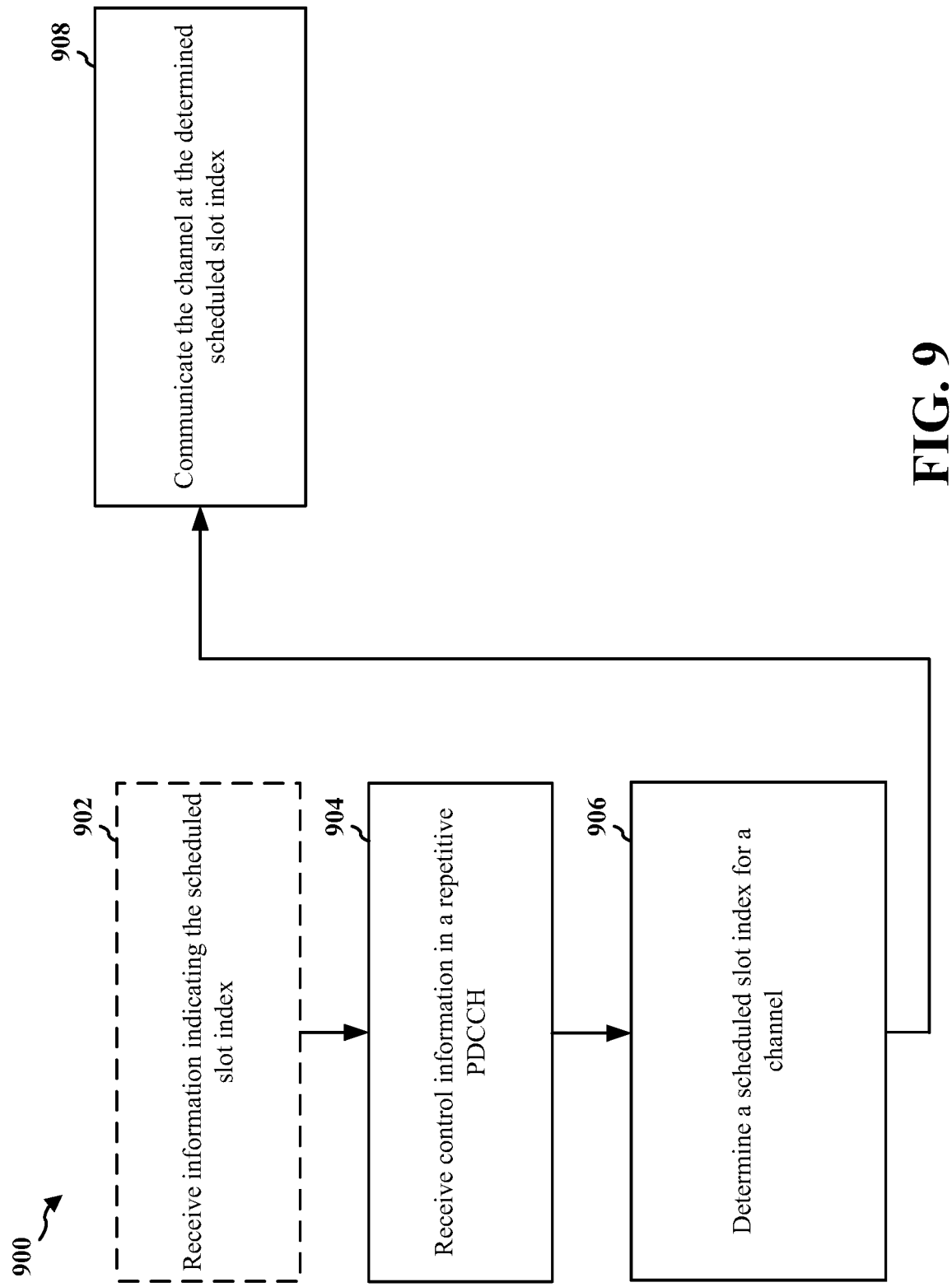
FIG. 9 is a flowchart of an exemplary method of wireless communication.

FIG. 9 is a flowchart 900 of a method of wireless communication. The method may be performed by a UE (e.g., the UE 104, 350, 404, and 802, and the apparatus 1002/1002'; the processing system 1114, which may include the memory 360 and which may be the entire UE or a component of the UE, such as TX processor 368, the RX processor 356, and/or the controller/processor 359) communicating with a base station (e.g., the base station 102, 180, 310, 402, 804, 1050). One or more of the illustrated operations may be omitted, transposed, or contemporaneous. The UE may implement the method of the diagram 800. In FIG. 9, optional aspects are illustrated with a dashed line.

At 902, the UE may be configured to receive information indicating the scheduled slot index. The scheduled slot index may be determined based on the received information. Step 902 may or may not occur.

At 904, the UE may be configured to receive control information in a repetitive PDCCH within a set of slots. For example, 904 may be performed by reception component 1004 of apparatus 1002. The repetitive PDCCH may schedule a channel for reception or transmission by the device. In some aspects, the channel may be a PDSCH. The repetitive PDCCH may schedule the PDSCH for reception by the UE. In some aspects, the channel may be a PUSCH. The repetitive PDCCH may schedule the PUSCH for transmission by the UE. In some aspects, the channel may carry A-CSI-RS. The repetitive PDCCH may schedule the channel for transmission of the A-CSI-RS by the UE.

At 906, the UE may be configured to determine a scheduled slot index for the channel scheduled by the repetitive PDCCH. For example, 906 may be performed by scheduled slot determination component 1006 of apparatus 1002. The scheduled slot index may be determined based on a slot index of at least one PDCCH of the repetitive PDCCH. In some aspects, the repetitive PDCCH may include n received PDCCHs and the scheduled slot index may be determined based on a slot index of an $i^{th}$ received PDCCH of the n received PDCCHs. In some aspects, the slot index may be determined based on a $1^{st}$ received PDCCH of the n PDCCHs of the repetitive PDCCH. In some aspects, the slot index may be determined based on an $n^{th}$ received PDCCH of the n PDCCHs of the repetitive PDCCH. In some aspects, the scheduled slot index may be determined independently of slot indexes in which the repetitive PDCCH is received. For example, the scheduled slot index may be configured to be an $m^{th}$ slot in a frame including the repetitive PDCCH, the $m^{th}$ slot being fixed. Block 906 may correspond to block 808 of FIG. 8.

At 908, the UE may be configured to communicate the channel at the determined scheduled slot index and based on the received control channel information in the repetitive PDCCH. For example, 908 may be performed by transmission component 1008 of apparatus 1002. In some aspects, communicating the channel may include receiving the PDSCH. In some aspects, communicating the channel may include transmitting the PUSCH. In some aspects, communicating the channel may include transmitting the A-CSI-RS on the channel. The channel may be communicated through one of multiple receptions by the UE or multiple transmission by the UE. In some aspects, the determined scheduled slot index may be a slot index of a particular reception of the channel of the multiple receptions of the channel. In some aspects, the determined scheduled slot index may be a slot index of a particular transmission of the channel of the multiple transmissions of the channel.

In one configuration, the channel is a PDSCH, and the repetitive PDCCH schedules the PDSCH for reception by the UE. A grant may be transmitted by a base station to the UE, and the grant includes control information and instructions for the UE to prepare for a DL reception, as shown in FIG. 8 at 806. Communicating the channel may include receiving the PDSCH, as shown in FIG. 8 at 810'. In another configuration, the channel is a PUSCH, and the repetitive PDCCH schedules the PUSCH for transmission by the UE. In such instance, the grant transmitted to the UE will include control in formation instructing the UE to prepare for a UL transmission at a scheduled time, as shown in FIG. 8 at 806. Communicating the channel may include transmitting the PUSCH, as shown in FIG. 8 at 810". In yet other configurations, the channel carries A-CSI-RS, and the repetitive PDCCH schedules the channel for transmission of the A-CSI-RS by the UE. Since repetitive PDCCH may schedule a channel for transmission of the A-CSI-RS, the methods disclosed herein may also be used to determine the scheduling of the A-CSI-RS. Communicating the channel may include transmitting the A-CSI-RS on the channel, as shown in FIG. 8 at 810'''. In one configuration the scheduled slot index is determined by a slot index of at least one PDCCH of the repetitive PDCCH. For example, in certain aspects of FIG. 1, the UE (e.g., 104) may be configured to determine a scheduled slot index for a channel scheduled by a repetitive physical downlink control channel (PDCCH) from a base station 180. In one configuration, the UE 104 may receive control information in a repetitive PDCCH within a set of slots. The repetitive PDCCH schedules a channel for reception or transmission by the UE. Subsequently, the UE 104 may determine a scheduled slot index for the channel scheduled by the repetitive PDCCH. Subsequently, the UE 104 may communicate (transmit or receive) the channel at the determined scheduled slot index and based on the received control information in the repetitive PDCCH. The repetitive PDCCH may include n received PDCCHs and the scheduled slot index may be determined based on a slot index of an $i^{th}$ received PDCCH of the n received PDCCHs. For example, with reference to FIG. 7, the repeated PDCCH transmissions are being repeated across adjacent slots, Slot n and Slot n+1, such that the scheduled slot index may be determined by any of the received PDCCHs. FIG. 7 shows only two slots, but more slots may be present, such as but not limited to Slot n+2, Slot n+3, etc. In some examples, the slot index may be determined based on a $1^{st}$ received PDCCH of the n PDCCHs of the repetitive PDCCH. For example, with reference to FIG. 7, namely Option 1 700, the PDCCH is being repeated across the first two slots, Slot n and Slot n+1. In such instance the monitor occasion is at the beginning of Slot n and Slot n+1, such that the PDCCH at Slot n may be the $1^{st}$ received PDCCH of the repetitive PDCCH. In other examples, the slot index may be determined based on the $n^{th}$ received PDCCH of the n PDCCHs of the repetitive PDCCH. For example, with reference to FIG. 7, namely Option 2 720, the PDCCH is being repeated across the first two slots, Slot n and Slot n+1, while the monitor occasion is at the beginning of Slot n and Slot n+1. However, the PDCCH received at Slot n+1 may be the last or the $n^{th}$ received PDCCH of the n PDCCHs of the repetitive PDCCH.

The method of FIG. 9 may further include receiving information indicating the scheduled slot index. The scheduled slot index may be determined based on the received information. In one example, the repetitive PDCCH may be repeated across multiple slots, such as Slot n, Slot n+1, and Slot n+2. The scheduled slot index may be determined based on any one of the repetitive PDCCH at Slot n, Slot n+1, or Slot n+2. The scheduled slot index may be determined independently of slot indexes in which the repetitive PDCCH is received. In some configurations, the slot index may be determined in a specification such that the scheduled slot index is hard coded within the UE, and thus independent of the control information received in the PDCCH transmission. In some configurations, the scheduled slot index is configured to be an mth slot in a frame including the repetitive PDCCH with the mth slot being fixed. The channel may be communicated through one of multiple receptions by the UE or multiple transmissions by the UE, and the determined scheduled slot index is a slot index of a particular reception of the channel of the multiple receptions of the channel or a slot index of a particular transmission of the channel of the multiple transmissions of the channel. For example, as shown in FIG. 7, the slot index may be based on any one of the repetitive PDCCHs transmitted, which may include n received PDCCHs. FIG. 7 shows Slot n and Slot n+1, but FIG. 7 is not intended to be limited to only Slot n and Slot n+1. Many more slots may be present, such that a repetitive PDCCH may be received.

As discussed above, at least one advantage of the invention is that various types of channels scheduled by the PDCCH may be determined based on the methods disclosed herein and is not intended to be limited to determining PDSCH slot index.

Figure 10:
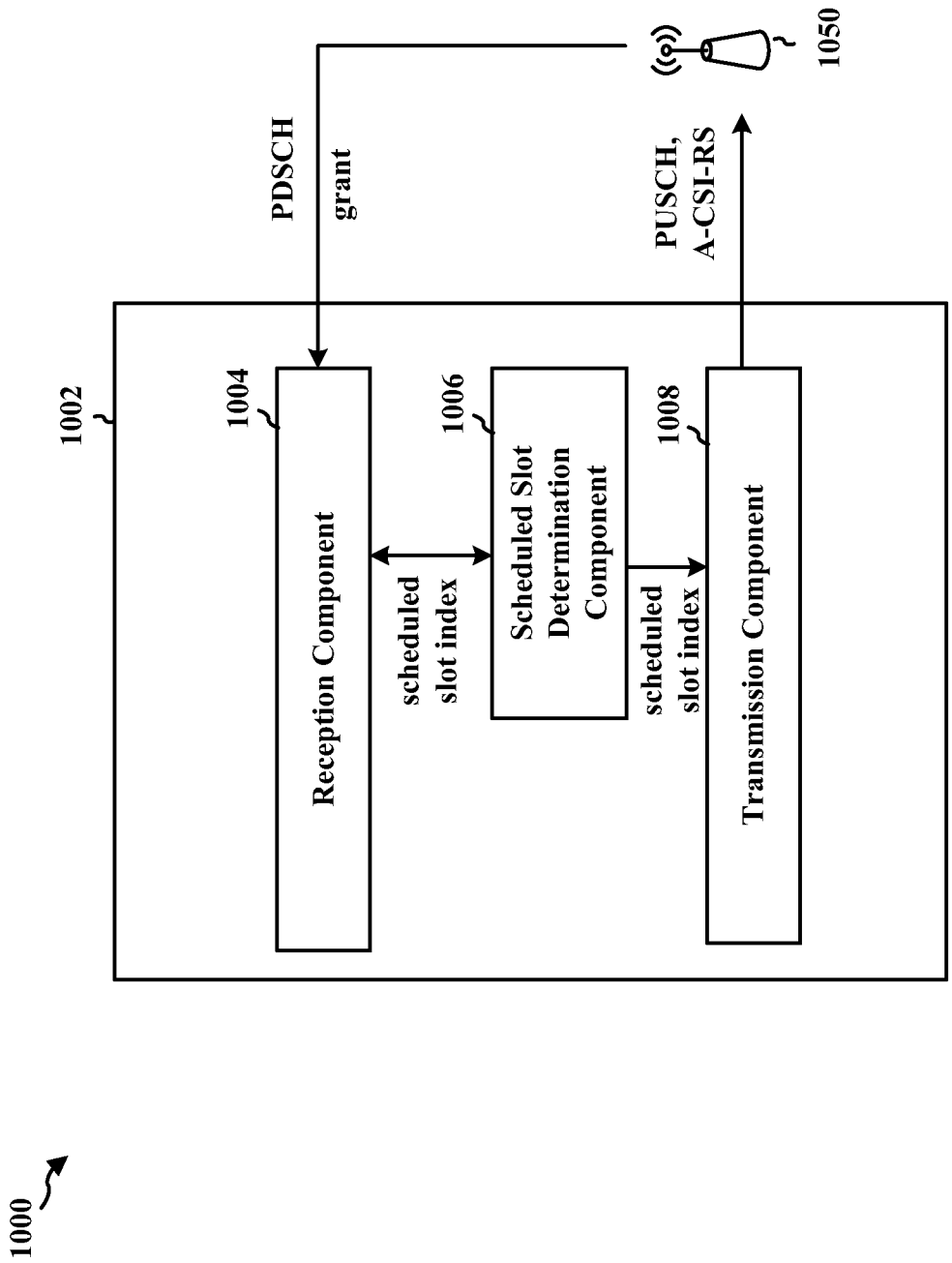
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE (e.g., the UE 104, 350, 404, and 802, and the apparatus 1002/1002'; the processing system 1114, which may include the memory 360 and which may be the entire UE or a component of the UE, such as TX processor 368, the RX processor 356, and/or the controller/processor 359). Alternately, the apparatus may be a component of a UE.

The apparatus 1002 includes a reception component 1004 that may be configured to receive control information in a grant within a repetitive PDCCH within a set of slots, e.g., as described in connection with 904 of FIG. 9. The repetitive PDCCH may schedule a channel for reception or transmission by the UE. The apparatus includes a scheduled slot determination component 1006 that may be configured to determine a scheduled slot index for the channel scheduled by the repetitive PDCCH, e.g., as described in connection with 906 of FIG. 9. The scheduled slot determination component 1006 may be configured to provide the determined scheduled slot index to the reception component 1004 and/or a transmission component 1008. The apparatus 1002 may include the transmission component 1008. The reception component 1004 and/or the transmission component 1008 may be configured to communicate the channel at the determined scheduled slot index and based on the received control information in the repetitive PDCCH, e.g., as described in connection with 908 of FIG. 9.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
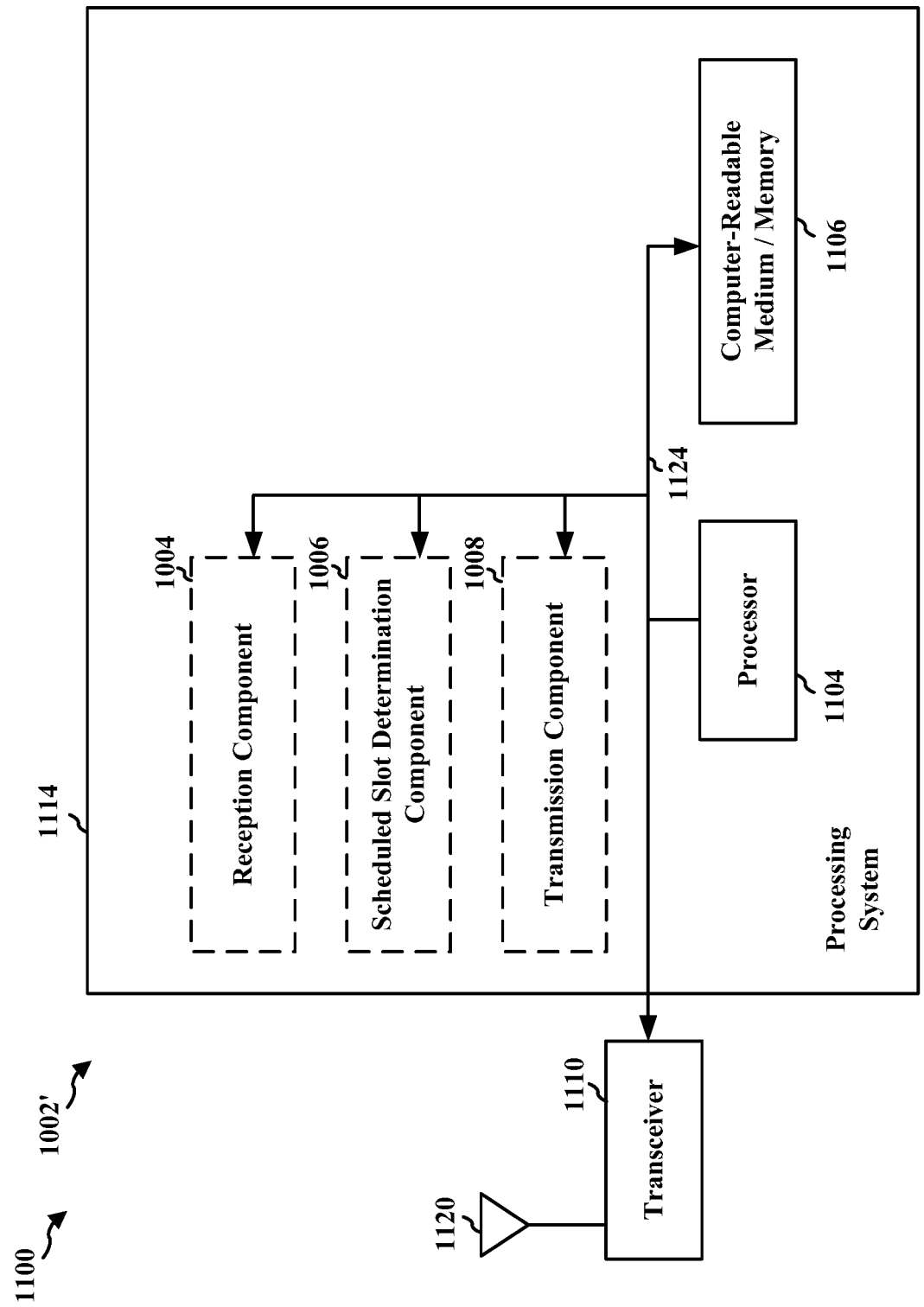
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1008, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1002/1002' for wireless communication includes means for means for receiving control information in a repetitive PDCCH within a set of slots. The repetitive PDCCH schedules a channel for reception or transmission by the UE. The apparatus 1002/1002' includes means for determining a scheduled slot index for the channel scheduled by the repetitive PDCCH. The apparatus 1002/1002' includes means for communicating the channel at the determined scheduled slot index and based on the received control information in the repetitive PDCCH. The apparatus 1002/1002' further includes means for receiving information indicating the scheduled slot index. The scheduled slot index may be determined based on the received information. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means The present disclosure is directed to determining a scheduled slot index for a channel scheduled by a repetitive PDCCH. A UE may receive control information in a repetitive PDCCH within a set of slots. The repetitive PDCCH schedules a channel for reception or transmission by the UE. The UE may communicate (e.g., transmit or receive) the channel at the determined scheduled slot index and based on the received control information in the repetitive PDCCH. The repetitive PDCCH may include n received PDCCHs and the scheduled slot index may be determined based on a slot index of an ith received PDCCH of the n received PDCCHs. For example, when the PDCCH is repeated across multiple slots, then the scheduled PDSCH slot may be determined by either the $1^{st}$ PDCCH slot or the last PDCCH slot. At least one advantage of repetitive PDCCH is that it may be utilized to extend control channel coverage. Repetitive PDCCH may assist in making the PDCCH decodable by the UE especially in environments where the signal quality and/or received signal power is poor. At least one advantage of the disclosure is that the scheduled PDSCH may be scheduled as early as in the $1^{st}$ PDCCH slot, which may have the advantage of reducing latency because PDSCH decoding may start soon after the decoding of the PDCCH has finished. At least another advantage of the disclosure is that the scheduled PDSCH may be scheduled for the last slot. At least one advantage of determining the scheduled PDSCH slots with PDCCH repetition is that the manner of determining the scheduled PDSCH may also be used to determine other scheduled signals channels, such as but not limited to PUSCH and aperiodic channel state information reference signals (A-CSI-RS), both of which may be scheduled by the PDCCH.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   receiving control information carried in at least one repetition of a plurality of repetitions of a physical downlink control channel (PDCCH) repeated over at least one monitoring occasion of at least one search space; and
   communicating on a data channel in a slot offset from a reference slot on the PDCCH that is indexed to one of the plurality of repetitions,
   wherein the reference slot is indexed to one of the plurality of repetitions that is later in time than each other repetition of the plurality of repetitions of the PDCCH.

2. The method of claim 1, wherein the data channel is a physical downlink shared channel (PDSCH), and the communicating on the data channel comprises receiving data on the PDSCH.

3. The method of claim 1, wherein the data channel is a physical uplink shared channel (PUSCH), and the communicating on the data channel comprises transmitting data on the PUSCH.

4. The method of claim 1, wherein the data channel is configured to carry a set of aperiodic channel state information reference signals (A-CSI-RS), and the communicating on the data channel comprises communicating the A-CSI-RS on the data channel.

5. The method of claim 1, wherein the slot is offset in time from the reference slot.

6. The method of claim 1, wherein the reference slot is indexed to one of the plurality of repetitions that is earlier in time than each other repetition of the plurality of repetitions of the PDCCH.

7. The method of claim 1, further comprising:
   receiving information indicating the repetition of the plurality of repetitions of the PDCCH that indexes to the reference slot.

8. The method of claim 7, wherein information indicating the repetition of the plurality of repetitions of the PDCCH that indexes to the reference slot is independent of one slot having the repetition of the plurality of repetitions.

9. The method of claim 8, wherein the information indicating the repetition of the plurality of repetitions of the PDCCH that indexes to the reference slot is preconfigured in a memory or other storage.

10. The method of claim 1, wherein the slot in which to communicate on the data channel corresponds to one of a plurality of transmissions scheduled on the data channel.

11. An apparatus for wireless communication, the apparatus being a user equipment (UE), comprising:
    means for receiving control information carried in at least one repetition of a plurality of repetitions of a physical downlink control channel (PDCCH) repeated over at least one monitoring occasion of at least one search space; and means for communicating on a data channel in a slot offset from a reference slot on the PDCCH that is indexed to one of the plurality of repetitions,
wherein the reference slot is indexed to one of the plurality of repetitions that is later in time than each other repetition of the plurality of repetitions of the PDCCH.

12. The apparatus of claim 11, wherein the data channel is a physical downlink shared channel (PDSCH), and the means for communicating on the data channel is configured to receive data on the PDSCH.

13. The apparatus of claim 11, wherein the data channel is a physical uplink shared channel (PUSCH), and the means for communicating on the data channel is configured to transmit data on the PUSCH.

14. The apparatus of claim 11, wherein the data channel is configured to carry a set of aperiodic channel state information reference signals (A-CSI-RS), and the means for communicating on the data channel is configured to communicate the A-CSI-RS on the data channel.

15. The apparatus of claim 11, wherein the slot is offset in time from the reference slot.

16. The apparatus of claim 11, wherein the reference slot is indexed to one of the plurality of repetitions that is earlier in time than each other repetition of the plurality of repetitions of the PDCCH.

17. The apparatus of claim 11, further comprising means for receiving information indicating the repetition of the plurality of repetitions of the PDCCH that indexes to the reference slot.

18. The apparatus of claim 17, wherein information indicating the repetition of the plurality of repetitions of the PDCCH that indexes to the reference slot is independent of one slot having the repetition of the plurality of repetitions.

19. The apparatus of claim 18, wherein the information indicating the other slot that comprises the repetition of the plurality of repetitions of the PDCCH that indexes to the reference slot is preconfigured in a memory or other storage.

20. The apparatus of claim 11, wherein the slot in which to communicate on the data channel corresponds to one of a plurality of transmissions scheduled on the data channel.

21. An apparatus for wireless communication, the apparatus being a user equipment (UE), comprising:
a memory; and
at least one processor coupled to the memory and configured to:
receive control information carried in at least one repetition of a plurality of repetitions of a physical downlink control channel (PDCCH) repeated over at least one monitoring occasion of at least one search space; and
communicate on a data channel in a slot offset from a reference slot on the PDCCH that is indexed to one of the plurality of repetitions,
wherein the reference slot is indexed to one of the plurality of repetitions that is later in time than each other repetition of the plurality of repetitions of the PDCCH.

22. The apparatus of claim 21, wherein the data channel is a physical downlink shared channel (PDSCH), and the at least one processor is configured to receive data on the PDSCH to communicate on the data channel.

23. The apparatus of claim 21, wherein the data channel is a physical uplink shared channel (PUSCH), and the at least one processor is configured to transmit data on the PUSCH to communicate on the data channel.

24. The apparatus of claim 21, wherein the data channel is configured to carry a set of aperiodic channel state information reference signals (A-CSI-RS), and the at least one processor is configured to communicate the set of A-CSI-RS on the data channel to communicate on the data channel.

25. The apparatus of claim 21, wherein the at least one processor is further configured to receive information indicating the repetition of the plurality of repetitions of the PDCCH that indexes to the reference slot.

26. A non-transitory computer-readable medium storing computer executable code in a user equipment (UE), comprising code when executes by processor, configured to:
receive control information carried in at least one repetition of a plurality of repetitions of a physical downlink control channel (PDCCH) repeated over at least one monitoring occasion of at least one search space; and
communicate on a data channel in a slot offset from a reference slot on the PDCCH that is indexed to one of the plurality of repetitions, wherein the reference slot is indexed to one of the plurality of repetitions that is later in time than each other repetition of the plurality of repetitions of the PDCCH.

* * * * *